United States Patent
Garbark

(10) Patent No.: US 9,968,925 B2
(45) Date of Patent: May 15, 2018

(54) PROCESS FOR RECOVERING AND RECYCLING A CATALYST

(71) Applicant: Battelle Memorial Institute, Columbus, OH (US)

(72) Inventor: Daniel B. Garbark, Blacklick, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 66 days.

(21) Appl. No.: 15/052,057

(22) Filed: Feb. 24, 2016

(65) Prior Publication Data

US 2016/0250627 A1 Sep. 1, 2016

Related U.S. Application Data

(60) Provisional application No. 62/121,822, filed on Feb. 27, 2015.

(51) Int. Cl.
*B01J 38/48* (2006.01)
*B01J 27/128* (2006.01)
(Continued)

(52) U.S. Cl.
CPC .............. *B01J 38/48* (2013.01); *B01J 27/128* (2013.01); *C08G 18/36* (2013.01); *C11C 3/00* (2013.01); *B01D 15/00* (2013.01)

(58) Field of Classification Search
CPC ........... B01J 38/48; B01J 27/128; C11C 3/00; C08G 18/36; B01D 15/00
See application file for complete search history.

(56) References Cited

U.S. PATENT DOCUMENTS

| 4,122,035 A | * | 10/1978 | Cislo | ...................... B01J 21/20 |
| | | | | 502/31 |
| 6,433,121 B1 | | 8/2002 | Petrovic et al. | |

(Continued)

FOREIGN PATENT DOCUMENTS

| WO | 2010104609 A2 | 9/2010 |
| WO | 2014176515 A2 | 10/2014 |
| WO | 2015163939 A1 | 10/2015 |

OTHER PUBLICATIONS

Barluenga et al., "Copper(II) Tetrafluoroborate Catalyzed Ring-Opening Reaction of Epoxides with Alcohols at Room Temperature", Organic Letters, 2002, vol. 4, No. 17, pp. 2817-2819.

(Continued)

*Primary Examiner* — Jennifer A Smith
(74) *Attorney, Agent, or Firm* — MacMillan, Sobanski & Todd, LLC

(57) ABSTRACT

A process of recovering and recycling a catalyst includes feeding an epoxidized fatty acid ester, a solvent, and a catalyst to a reactor. The solvent is reacted with the epoxidized fatty acid ester to open epoxy rings of the ester and produce a polyol. Some unreacted solvent remains after the reaction. The unreacted solvent is separated from a mixture of the polyol and the catalyst. The polyol/catalyst mixture is passed to an adsorption bed so that the catalyst is adsorbed and the polyol passes through the bed. The polyol is recovered. The adsorption bed is rinsed with the unreacted solvent to desorb the catalyst and obtain a mixture of the solvent and the catalyst. The mixture of solvent and catalyst is recycled to the reactor for further reaction.

15 Claims, 1 Drawing Sheet

(51) Int. Cl.
*C08G 18/36* (2006.01)
*C11C 3/00* (2006.01)
*B01D 15/00* (2006.01)

(56) References Cited

U.S. PATENT DOCUMENTS

| | | |
|---|---|---|
| 7,786,239 B2 | 8/2010 | Petrovic et al. |
| 2012/0129746 A1 | 5/2012 | Benecke et al. |
| 2012/0214938 A1 | 8/2012 | Mannari |

OTHER PUBLICATIONS

Capes et al., "Investigation of copper(ii) tetrafluoroborate catalysed epoxide opening", Tetrahedron Letters, 2011, vol. 52, pp. 7091-7094.

Desroches et al., "From Vegetable oils to polyurethanes: synthetic routes to polyols and main industrial products", Polymer Reviews, 2012, vol. 52, pp. 1-3.

Kamal et al., "Copper(II) tetrafluoroborate catalyzed ring-opening of epoxides by amines", Tetrahedron Letters, 2005, vol. 46, pp. 2675-2677.

* cited by examiner

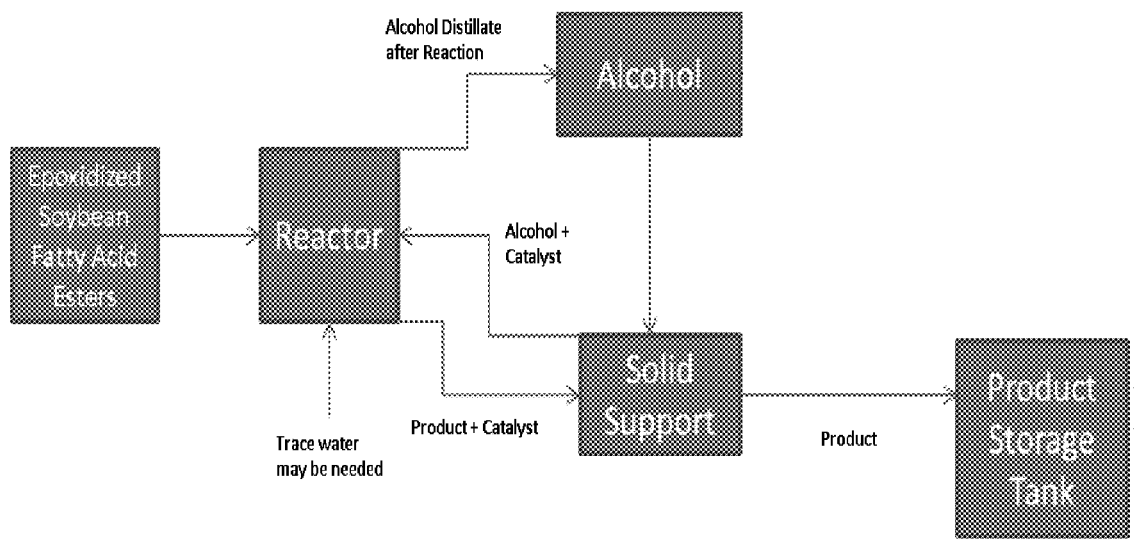

PROCESS FOR RECOVERING AND RECYCLING A CATALYST

CROSS-REFERENCE TO RELATED APPLICATIONS

This application claims the benefit of U.S. Provisional Application No. 62/121,822 filed Feb. 27, 2015, the disclosure of which is incorporated herein by reference.

BACKGROUND OF THE INVENTION

This invention relates in general to processes for recovering and recycling catalysts used in chemical reactions. More particularly, it relates to recovering and recycling a catalyst used in an epoxy ring opening reaction.

Products derived from renewable feedstocks such as vegetable, algal or animal oils or fats would be desirable to help reduce the world dependence on oil and other fossil-derived hydrocarbons. Moreover, these oils or fats are typically biodegradable, which would help reduce the introduction of waste into the environment. Products produced with these feedstocks may also have improved properties.

An important way to utilize the renewable feedstocks is by the production of polyols from the feedstocks which can be used to produce a number of products. For example, there has been great interest in the ring opening of epoxidized soybean oil and other triglyceride oils to produce polyols.

A number of different catalysts are known for use in ring opening reactions. For example, the ring opening catalyst may be an acid catalyst. Examples of Lewis acids that may be suitable include phosphorous trichloride and boron halides. Examples of Bronsted acids include hydrofluoroboric acid, trifluoroacetic acid, sulfuric acid, hydrochloric acid phosphoric acid, boronic acids, sulfonic acids, and carboxylic acids.

It is also known to use tetrafluoroborate salts as catalysts in ring opening reactions. For example, Barluenga et al "Copper(II) Tetrafluoroborate Catalyzed Ring-Opening Reaction of Epoxides with Alcohols at Room Temperature", Org. Lett., Vol. 4, No. 17, 2002, discloses ring opening of different epoxides by reaction with alcohols using copper tetrafluoroborate catalyst. Also, Benecke et al, U.S. patent application no. 2012/0129746 A1, published May 24, 2012, discloses hydrolyzing epoxidized soybean oil using copper tetrafluoroborate to produce a diol. Neither reference suggests a way to recover and recycle the catalyst.

Therefore, it would be desirable to provide a process of recovering and recycling a catalyst in ring opening reactions and other reactions.

SUMMARY OF THE INVENTION

This invention relates to a process of recovering and recycling a catalyst. A catalyzed reaction is conducted in which a solvent is a reactant and becomes part of the product, and in which some unreacted solvent remains after the reaction. The unreacted solvent is separated from a reaction mixture of the product and the catalyst. The catalyst is adsorbed from the product/catalyst mixture. The product is recovered. The catalyst is desorbed using the unreacted solvent to obtain a mixture of the solvent and the catalyst. The mixture of solvent and catalyst is recycled for further reaction.

In a particular embodiment, the process of recovering and recycling a catalyst includes feeding an epoxide, a solvent, and a catalyst to a reactor. The solvent is reacted with the epoxide to open epoxy rings of the epoxide and produce a polyol. Some unreacted solvent remains after the reaction. The unreacted solvent is separated from a mixture of the polyol and the catalyst. The polyol/catalyst mixture is passed to an adsorption bed so that the catalyst is adsorbed and the polyol passes through the bed. The polyol is recovered. The adsorption bed is rinsed with the unreacted solvent to desorb the catalyst and obtain a mixture of the solvent and the catalyst. The mixture of solvent and catalyst is recycled to the reactor for further reaction.

In a more particular embodiment, the process of recovering and recycling a catalyst includes feeding an epoxidized fatty acid ester, a solvent, and a catalyst to a reactor. The solvent is reacted with the epoxidized fatty acid ester to open epoxy rings of the ester and produce a polyol. Some unreacted solvent remains after the reaction. The unreacted solvent is separated from a mixture of the polyol and the catalyst. The polyol/catalyst mixture is passed to an adsorption bed so that the catalyst is adsorbed and the polyol passes through the bed. The polyol is recovered. The adsorption bed is rinsed with the unreacted solvent to desorb the catalyst and obtain a mixture of the solvent and the catalyst. The mixture of solvent and catalyst is recycled to the reactor for further reaction.

Various aspects of this invention will become apparent to those skilled in the art from the following detailed description of the preferred embodiment.

BRIEF DESCRIPTION OF THE DRAWING

FIG. 1 is a block process schematic of a catalyzed process of reacting epoxidized soybean fatty acid esters with alcohol to cause ring opening of the epoxy groups and produce polyols. The process includes recovering and recycling the catalyst according to the invention.

DETAILED DESCRIPTION OF THE PREFERRED EMBODIMENT

The present invention relates to a process for recovering and recycling a catalyst used in a catalyzed reaction. In this reaction, a solvent for the reaction is also a reactant and becomes part of the product. Such reactions can include, for example, different types of substitution reactions, alcoholysis reactions and hydrolysis reactions.

In a particular embodiment, the reaction is a catalyzed ring opening reaction. For example, the process of the invention can be used during the reaction of an epoxide with a solvent to open one or more epoxy rings of the epoxide. By "epoxide" as used herein is meant a compound in which an oxygen atom is directly attached to two adjacent carbon atoms of a carbon chain or ring system—in other words, a compound including a cyclic ether with a three-atom ring. Some nonlimiting examples of epoxides include epoxy silanes, bisphenol A diglycidyl ether, novalac epoxy resins, and epoxy/diepoxy alkanes such as 3,4-epoxy-1-butene and 1,3-butadiene diepoxide. In a particular example, the process can be used during the reaction of epoxidized fatty acid esters with alcohol or with water to open the epoxy rings of the esters and produce polyols.

Referring to the drawing, FIG. 1 shows epoxidized soybean fatty acid esters being fed to a reactor. The reactor type and reaction conditions can be any suitable for performing the particular reaction.

The fatty acid ester can be any type which can be epoxidized to produce an ester including an epoxy ring. For example, the fatty acid ester may be a triglyceride, a fatty acid methyl ester or a fatty acid ethyl ester. In a typical epoxidation reaction, a triglyceride is exposed to an oxidant such as a peroxyacid or hydroperoxide to form epoxy rings on the fatty acids.

Triglycerides, also known as triacylglycerols or triacylglycerides, are the major component of plant oils, algal oils and animal fats (the terms "oils" and "fats" are used interchangeably). Triglycerides can also be produced synthetically. A triglyceride is a compound consisting of three fatty acids esterified to a glycerol. Some examples of typical fatty acids of plant oils are stearic, palmitic, oleic, linoleic and linolenic.

Plant oils (or vegetable oils) are any of a large group of oils obtained from the seeds, fruits or leaves of plants. Some nonlimiting examples of plants from which oils can be derived include soybean, canola, palm, olive, peanut, sesame, sunflower and safflower.

Many different types of algae produce triglyceride oils. Specific examples include heterotrophic or obligate heterotrophic microalgae of the phylum Chlorophtya, the class Trebouxiophytae, the order Chlorellales, or the family Chlorellacae.

In certain embodiments, the triglyceride is selected from the group consisting of vegetable oils, animal fats and combinations thereof. In some embodiments, the triglyceride excludes algal oils.

As shown in FIG. 1, an alcohol is also fed to the reactor. The alcohol is the solvent in the reaction shown. FIG. 1 shows the alcohol being recycled to the reactor after the reaction, as will be described in more detail below. However, at the start of the reaction, the alcohol or other solvent is fed to the reactor from a separate supply of alcohol (not shown). The solvent is supplied in an amount in excess of the amount used in the reaction and some unreacted solvent remains after the reaction.

Any suitable type of solvent, or combinations of different solvents, may be used as a reactant in the catalyzed reaction. When the reaction is a ring opening reaction, the solvent functions as a ring-opener in the reaction. Solvents that function as ring-openers may include alcohols, water, and other compounds having one or more nucleophilic groups. Some nonlimiting examples of other solvents that may be used include carboxylic acids of carbon chain C1-C18.

In certain embodiments, monohydric alcohols having between one and six carbon atoms are used as the solvent, more particularly one to four carbon atoms, further more particularly methanol, ethanol or propanol. The alcohol may also be a polyol, having two or more hydroxyl groups per molecule. Examples of polyols include ethylene glycol, propylene glycol, 1,3 propanediol, butylene-glycol, 1,4-butane diol, 1,5-pentane-diol, 1,6-hexanediol, polyethylene glycol and polypropylene glycol, and vegetable oil-based polyols.

As shown in FIG. 1, a catalyst is also fed to the reactor. FIG. 1 shows the catalyst being recycled to the reactor after the reaction, as will be described in more detail below. However, at the start of the reaction, the catalyst is fed to the reactor from a separate supply of catalyst (not shown). For example, the catalyst may be dissolved in the solvent and fed to the reactor along with the solvent. The catalyst used in the reaction can be any type suitable for the particular reaction.

For example, in a ring opening reaction, the catalyst may be an acid. Some examples of ring opening acid catalysts include phosphorous compounds such as phosphorous trichloride, phosphoric acid, phosphorous acid and hypophosphorous acid. Other examples of ring opening acid catalysts include fluoroboric acid (tetrafluoroboric acid, $H_3OBF_4$), trifluoroacetic acid, sulfuric acid, hydrochloric acid, boronic acids, boron halides, sulfonic acids (for example, para-toluene sulfonic acid, methanesulfonic acid, and trifluoromethane sulfonic acid), and carboxylic acids (for example, formic acid and acetic acid). Ion exchange resins in the protic form may also be used.

Alternatively, the ring opening catalyst may be an acid salt. In certain embodiments, the catalyst is a salt of tetrafluoroboric acid, such as a metal salt. For example, the catalyst may be copper(II) tetrafluoroborate or iron(II) tetrafluoroborate.

The use of a tetrafluoroborate salt as the catalyst in a ring opening reaction of epoxidized fatty acid esters can help to avoid undesired side reactions. The ring opening of epoxide readily takes place and there is little to no transesterification of the triglyceride backbone. A tetrafluoroborate salt catalyst can also facilitate purification leading to increased yield of desired product. The final polyol hydroxyl value may be near theoretical; for example, the polyol may have a hydroxyl value within a range of from about 75 to about 400. The hydroxyl value can be measured by any suitable method; for example, by ASTM D 1957 or ASTM E-222-10.

In certain embodiments, the catalyst is used in hydrated form. The hydrated form of the catalyst may be the form in which the catalyst is soluble in the solvent. For example, the hydrated form of tetrafluoroborate is soluble in alcohol and/or water. As shown in FIG. 1, when certain catalysts are used, trace water may be fed to the reactor at the end of the reaction to maintain the catalyst in its hydrated form when it is recycled to the reactor.

The catalyst is used in any suitable amount. For example, the catalyst may be present in an amount ranging from 0.01 wt % to 0.3 wt %, based on the total weight of the reaction mixture.

A reaction schematic for the production of a polyol from an epoxidized oleic acid ester (one of many fatty acids contained in soybean oil) can be seen below:

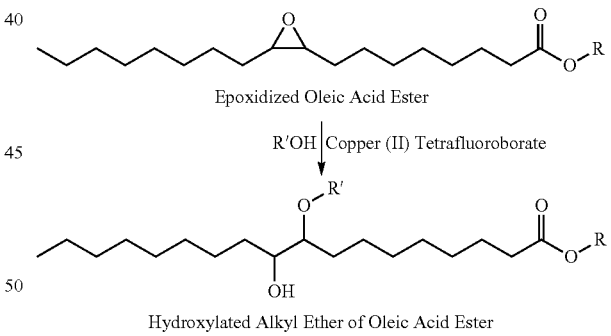

As shown in FIG. 1, after the reaction, the unreacted alcohol is separated from a reaction mixture which includes the product and the catalyst. The alcohol or other solvent can be separated by any suitable method. For example, the solvent may be separated by distillation. Any suitable distillation apparatus and process conditions can be used. FIG. 1 shows the alcohol distillate after reaction having been separated from the product and catalyst.

Further as shown in FIG. 1, after the reaction, a mixture of the product and the catalyst are removed from the reactor. Then the catalyst is adsorbed from the product/catalyst mixture to separate it from the product. The catalyst can be adsorbed from the reaction mixture using any suitable method and apparatus/material. In certain embodiments, the catalyst is adsorbed on an adsorption medium. For example, as shown in FIG. 1, the product/catalyst mixture is passed to a solid support or adsorption bed comprising an adsorption material so that the catalyst is adsorbed on the adsorption material. The product, which is a liquid polyol in the reaction shown, passes through the adsorption bed and is recovered. The product may be retained in a product storage tank as shown.

The process can use any type of adsorption medium that is suitable for adsorbing the catalyst. For example, in the process shown in FIG. 1, the catalyst may be adsorbed on a bed of silica gel. Other examples of adsorption media include alumina, alumina silicate, magnesium silicate, activated carbon, and molecular sieves such as zeolites. The adsorption medium may be self-supporting or supported on a solid support structure. A solid support can have any suitable structure and can be made from any suitable material.

As shown in FIG. 1, the catalyst is then desorbed using the unreacted solvent (alcohol in the embodiment shown) to obtain a mixture of the solvent and the catalyst. The desorption of the catalyst with the solvent can be conducted using any suitable process conditions. In the embodiment shown, the distilled alcohol is used to rinse the adsorbed catalyst off of the adsorption bed or solid support.

Further as shown in FIG. 1, the mixture of solvent (e.g., alcohol) and catalyst is then recycled to the reactor for further reaction. Thus, the invention provides an effective process of recovering and recycling a catalyst in epoxy ring opening reactions to produce polyols. The process may also be useful in other types of reactions.

The polyols produced by the process can in turn be used to produce a wide variety of desired products. For example, the polyols may be used to produce polyurethanes, coatings, adhesives, sealants, elastomers and lubricants. For example, methods and compositions for producing soybean oil based lubricants are disclosed in U.S. patent application no. 2012/0129746 A1, published May 24, 2012, which is incorporated by reference herein. Methods and compositions for producing polyurethanes and other products are disclosed in International application no. PCT/US2014/062821, filed Oct. 29, 2014, which is incorporated by reference herein.

EXAMPLES

Example 1—Ring Opening of Epoxidized Soybean Oil with Copper Tetrafluoroborate Catalyst, and Recovery and Recycling of the Catalyst Referring to FIG. 1, epoxidized soybean oil and methanol are fed to a reactor and heated. Copper (II) tetrafluoroborate hydrate catalyst is dissolved in methanol and fed to the reactor. Heating is continued until the reaction is completed to produce a polyol. The methanol is then distilled off and the reaction mixture is passed through a bed of silica gel. The distilled alcohol is then used to rinse the adsorbed catalyst off of the bed and added back to the reactor containing epoxidized soybean oil for further reaction. Trace water may be added to maintain the hydrated form of the catalyst.

Example 2—Ring Opening of Epoxidized Soybean Oil with Iron (II) Tetrafluoroborate Catalyst Referring to FIG. 1, epoxidized soybean oil and methanol are fed to a reactor and heated. Iron (II) tetrafluoroborate hydrate catalyst is dissolved in methanol and fed to the reactor. Heating is continued until the reaction is completed to produce a polyol.

Example 3—Ring Opening of Epoxidized Soybean Oil with Copper Tetrafluoroborate and Hexanoic Acid Referring to FIG. 1, epoxidized soybean oil and hexanoic acid are fed to a reactor and heated. Copper (II) tetrafluoroborate hydrate catalyst is dissolved in hexanoic acid and fed to the reactor. Heating is continued until the reaction is completed to produce a polyol. The excess hexanoic acid is then distilled off and the reaction mixture is passed through a bed of silica gel.

The invention claimed is:

1. A process of recovering and recycling a catalyst consisting of:
   feeding an epoxidized fatty acid ester, a solvent, and a catalyst to a reactor;
   reacting the catalyst and solvent with the epoxidized fatty acid ester to open epoxy rings of the ester and produce a polyol, where the polyol is formed from the epoxidized fatty acid ester and a portion of the solvent, and where some unreacted solvent remains after the formation of the polyol;
   separating the unreacted solvent from a mixture of the polyol and the catalyst;
   passing the polyol/catalyst mixture to an adsorption bed so that the catalyst is adsorbed and the polyol passes through the bed;
   recovering the polyol;
   rinsing the adsorption bed with the unreacted solvent to desorb the catalyst and obtain a mixture of the unreacted solvent and the catalyst; and
   recycling the mixture of unreacted solvent and catalyst to the reactor for further reaction.

2. The process of claim 1 wherein the solvent is an alcohol or a carboxylic acid of carbon chain C1-C18.

3. The process of claim 1 wherein the unreacted solvent is separated from the reaction mixture by distillation.

4. The process of claim 1 wherein the adsorption bed is silica gel, magnesium silicate or alumina.

5. The process of claim 1 wherein the fatty acid ester is a triglyceride.

6. The process of claim 5 wherein the triglyceride is soybean oil.

7. The process of claim 1 wherein the catalyst is a salt of tetrafluoroboric acid.

8. The process of claim 1 wherein the catalyst is in hydrated form during the reaction, and wherein the process further includes adding water to the reactor to maintain the recycled catalyst in hydrated form.

9. A process of recovering and recycling a catalyst consisting of:
   feeding to a reactor an epoxidized soybean oil, a solvent which is in alcohol, and a catalyst which is a salt of tetrafluoroboric acid;
   reacting the catalyst and solvent with the epoxidized soybean oil to open epoxy rings of the soybean oil and produce a polyol, where the polyol is formed from the epoxidized soybean oil and a portion of the solvent, and where some unreacted solvent remains after the formation of the polyol;
   separating the unreacted solvent by distillation from a mixture of the polyol and the catalyst;

passing the polyol/catalyst mixture to an adsorption bed so that the catalyst is adsorbed and the polyol passes through the bed;

recovering the polyol;

rinsing the adsorption bed with the unreacted solvent to desorb the catalyst and obtain a mixture of the unreacted solvent and the catalyst; and recycling the mixture of unreacted solvent and catalyst to the reactor for further reaction.

10. The process of claim 9 wherein the catalyst is in hydrated form during the reaction, and wherein the process further includes adding water to the reactor to maintain the recycled catalyst in hydrated form.

11. A process of recovering and recycling a catalyst consisting of:

feeding an epoxide, a solvent, and a catalyst to a reactor;

reacting the catalyst and solvent with the epoxide to open epoxy rings of the epoxide and produce a polyol, where the polyol is formed from the epoxide and a portion of the solvent, and where some unreacted solvent remains after the formation of the polyol;

separating the unreacted solvent from a mixture of the polyol and the catalyst;

passing the polyol/catalyst mixture to an adsorption bed so that the catalyst is adsorbed and the polyol passes through the bed;

recovering the polyol;

rinsing the adsorption bed with the unreacted solvent to desorb the catalyst and obtain a mixture of the unreacted solvent and the catalyst; and recycling the mixture of unreacted solvent and catalyst to the reactor for further reaction.

12. The process of claim 11 wherein the solvent is an alcohol.

13. The process of claim 11 wherein the unreacted solvent is separated from the reaction mixture by distillation.

14. The process of claim 11 wherein the catalyst is a salt of tetrafluoroboric acid.

15. The process of claim 11 wherein the catalyst is in hydrated form during the reaction, and wherein the process further includes adding water to the reactor to maintain the recycled catalyst in hydrated form.

* * * * *